US011611647B2

(12) United States Patent
Kozai et al.

(10) Patent No.: US 11,611,647 B2
(45) Date of Patent: Mar. 21, 2023

(54) HOT-WATER SUPPLY SYSTEM AND PROGRAM (71) Applicant: NORITZ CORPORATION, Hyogo (JP)

(72) Inventors: Takiji Kozai, Hyogo (JP); Takashi Furukawa, Hyogo (JP); Akihiko Tsugawa, Hyogo (JP)

(73) Assignee: NORITZ CORPORATION, Hyogo (JP)

(*) Notice: Subject to any disclaimer, the term of this patent is extended or adjusted under 35 U.S.C. 154(b) by 127 days.

(21) Appl. No.: 17/254,861

(22) PCT Filed: Jul. 29, 2019

(86) PCT No.: PCT/JP2019/029605
§ 371 (c)(1),
(2) Date: Dec. 22, 2020

(87) PCT Pub. No.: WO2020/044906
PCT Pub. Date: Mar. 5, 2020

(65) Prior Publication Data
US 2021/0266391 A1 Aug. 26, 2021

(30) Foreign Application Priority Data
Aug. 28, 2018 (JP) .............................. JP2018-159792

(51) Int. Cl.
*H04M 1/72415* (2021.01)
*F24H 9/00* (2022.01)
*H04W 68/02* (2009.01)
*H04L 67/75* (2022.01)

(52) U.S. Cl.
CPC ...... *H04M 1/72415* (2021.01); *F24H 9/0005* (2013.01); *H04L 67/75* (2022.05); *H04W 68/02* (2013.01)

(58) Field of Classification Search
CPC .... H04M 1/72415; F24H 9/0005; F24H 1/00; H04L 67/75; H04L 67/12; H04W 68/02; G06F 21/30; H04Q 9/00
See application file for complete search history.

(56) References Cited

FOREIGN PATENT DOCUMENTS

| JP | 2006018812 | | 1/2006 |
|---|---|---|---|
| JP | 2006018812 A | * | 1/2006 |
| JP | 2006277600 | | 10/2006 |

(Continued)

OTHER PUBLICATIONS

"International Search Report (Form PCT/ISA/210) of PCT/JP2019/029605", dated Sep. 10, 2019, with English translation thereof, pp. 1-4.

*Primary Examiner* — Farid Seyedvosoghi
(74) *Attorney, Agent, or Firm* — JCIPRNET (57) ABSTRACT

A hot-water supply system (1) remotely controls, via a server (50) and using a portable terminal device (30), a hot-water supply device (10) connectable to an external communication network (40). The hot-water supply system (1) is provided with a control unit which performs a notification process for notifying at least another, already-associated portable terminal device (30) that the portable terminal device (30) for performing remote control has been newly associated with the hot-water supply device (10). For example, a control unit of the server (50) performs the notification process as the control unit.

6 Claims, 6 Drawing Sheets (56) References Cited

FOREIGN PATENT DOCUMENTS

| | | | | |
|---|---|---|---|---|
| JP | 2006277600 | A * | 10/2006 | |
| JP | 2007094614 | | 4/2007 | |
| JP | 2010262532 | | 11/2010 | |
| JP | 4771846 | | 9/2011 | |
| JP | 2017204872 | | 11/2017 | |
| JP | 2017204872 | A * | 11/2017 | ............. G08C 17/00 |
| WO | 2015198874 | | 12/2015 | |
| WO | WO-2019214733 | A1 * | 11/2019 | ......... H04L 12/1877 |

\* cited by examiner

HOT-WATER SUPPLY SYSTEM AND PROGRAM

CROSS-REFERENCE TO RELATED APPLICATION

This application is a 371 application of the International PCT application serial no. PCT/JP2019/029605, filed on Jul. 29, 2019, which claims the priority benefit of Japan Patent Application No. 2018-159792, filed on Aug. 28, 2018. The entirety of each of the above-mentioned patent applications is hereby incorporated by reference herein and made a part of this specification.

TECHNICAL FIELD

The present invention relates to a hot-water supply system that remotely controls a hot-water supply device connectable to an external communication network using a portable terminal device, and a program that causes a portable terminal device that can communicate with the hot-water supply system to execute predetermined control.

BACKGROUND ART

In conventional hot-water supply devices, various settings are performed using a remote controller provided in a bathroom, a living room, and a kitchen. On the other hand, in recent years, a system that remotely controls a hot-water supply device using a portable terminal device such as a cellular phone has been under discussion. For example, Patent Literature 1 below discloses a system that remotely controls a hot-water heater using a cellular phone.

CITATION LIST

Patent Literature

[Patent Literature 1]
Japanese Patent No. 4771846

SUMMARY OF INVENTION

In the aforementioned hot-water system, it is necessary to prevent a hot-water supply device from being inappropriately remotely controlled by an unintended terminal device. For example, when a use state of the hot-water supply device is remotely monitored by an unintended third person, the third person may ascertain absence of people in a building in which the hot-water supply device is installed in a case where the hot-water supply device is not used for a long period.

With such a problem in view, an objective of the present invention is to provide a hot-water supply system and a program which can prevent a hot-water supply device from being inappropriately remotely controlled by an unintended terminal device.

A first aspect of the present invention relates to a hot-water supply system that remotely controls a hot-water supply device connectable to an external communication network using a portable terminal device via a server. The hot-water supply system according to this aspect includes a control unit which performs a notification process for notifying at least other portable terminal devices that have already been associated that the portable terminal device for performing the remote control has been newly associated with the hot-water supply device.

According to the hot-water supply system according to the present aspect, when a portable terminal device for performing remote control has been newly associated with the hot-water supply device, at least other portable terminal devices that have already been associated are notified of this so that users of the other portable terminal devices can determine whether the new association is suspicious. Accordingly, it is possible to prevent the hot-water supply device from being inappropriately remotely controlled by an unintended portable terminal device.

In the hot-water supply system according to the present aspect, the control unit may be configured to notify the other portable terminal devices of information based on a number of the portable terminal devices associated with the hot-water supply device in the notification process.

According to this configuration, users of other portable terminal devices can determine whether the new association is suspicious more appropriately, for example, by comparing the number of portable terminal devices carried by their families which will perform remote control of the hot-water supply device with the number of portable terminal devices notified of by the control unit. Accordingly, it is possible to more securely prevent the hot-water supply device from being inappropriately remotely controlled by an unintended portable terminal device.

In this configuration, the control unit may be configured to perform the notification to the newly associated portable terminal device in addition to the other portable terminal devices in the notification process.

When notification including the number of portable terminal devices associated with the hot-water supply device is also performed to the newly associated portable terminal device in this manner, a user of the newly associated portable terminal device can check whether past association with the hot-water supply device remains through the number that is notified of when the user initially performs association of the portable terminal device with the hot-water supply device, for example, at the time of moving or the like. Accordingly, it is possible to prevent a possibility that the hot-water supply device is undesirably remotely controlled by an inappropriate portable terminal device which which it was associated in the past.

In the hot-water supply system according to the present aspect, the control unit may be a control unit of the server.

In this manner, the notification process can be performed more smoothly by executing the notification process through the control unit of the server that manages remote control.

A second aspect of the present invention relates to a program causing a portable terminal device to execute a predetermined function. The program according to this aspect causes a computer of a portable terminal device to execute, when a notification according to the notification process according to the first aspect is received from the control unit, a function of performing report output based on the notification.

According to the program of this aspect, since report output is performed in a portable terminal device for performing remote control when a notification of new association of the portable terminal device with the hot-water supply device is received, a user of the portable terminal device can determine whether the new association is suspicious. Accordingly, it is possible to prevent the hot-water supply device from being inappropriately remotely controlled by an unintended portable terminal device.

In the program according to the present aspect, the function of performing report output may include a function of causing a display unit to display new association of the portable terminal device for performing the remote control.

Accordingly, the user of the portable terminal device can correctly ascertain that the portable terminal device for performing the remote control has been newly associated. Therefore, it is possible to appropriately determine whether new association is suspicious.

The second aspect of the present invention relates to a program causing a portable terminal device to execute a predetermined function. The program according to this aspect causes a computer of a portable terminal device to execute, when a notification including a number of portable terminal devices associated with the hot-water supply device is received from the control unit, at least a function of performing report output of the number.

According to the program of this aspect, the user of the portable terminal device can determine whether the new association is suspicious more appropriately, for example, by comparing the number of portable terminal devices carried by his/her family which will perform remote control of the hot-water supply device with a number reported and output through his/her portable terminal device. Accordingly, it is possible to more securely prevent the hot-water supply device from being inappropriately remotely controlled by an unintended portable terminal device.

In the program according to the present aspect, the function of performing report output may include a function of causing a display unit to display the number.

Accordingly, the user of the portable terminal device can correctly ascertain the number of portable terminal devices associated with the hot-water supply device. Therefore, it is possible to appropriately determine whether new association is suspicious.

As described above, according to the present invention, it is possible to provide a hot-water supply system and a program which can prevent a hot-water supply device from being inappropriately remotely controlled by an unintended terminal device.

The effects and significance of the present invention will become clearer from the description of the following embodiment. However, the following embodiment is merely an example when the present invention is embodied and the present invention is not limited to the following embodiment.

BRIEF DESCRIPTION OF DRAWINGS

(a) and (b) of FIG. 3 are flowcharts illustrating processes in a kitchen remote control and a portable terminal device for pairing of a hot-water supply device and a portable terminal device according to the embodiment.

(a) of FIG. 4 is a flowchart illustrating a process in a server for pairing of a hot-water supply device and a portable terminal device according to the embodiment. (b) of FIG. 4 is a diagram illustrating a configuration of information in which a hot-water supply device is associated with a portable terminal device managed in the server according to the embodiment.

(a) of FIG. 5 is a flowchart illustrating a notification process executed in the server when pairing has been newly performed according to the embodiment. (b) of FIG. 5 is a flowchart illustrating a report output process executed in the portable terminal device according to notification through the notification process according to the embodiment. (c) of FIG. 5 is a diagram illustrating a report screen displayed on a portable terminal device according to report output according to the embodiment.

(a) of FIG. 6 is a flowchart illustrating a notification process in the server according to a modified example. (b) of FIG. 6 is a flowchart illustrating a notification process in the server according to another modified example. (c) of FIG. 6 is a flowchart illustrating a report output process in a remote controller of a hot-water supply device according to another modified example. (d) of FIG. 6 is a diagram illustrating a screen displayed in the remote controller of the hot-water supply device according to the report output process according to the other modified example.

However, the figures are only for description and do not limit the scope of the invention.

DESCRIPTION OF EMBODIMENTS

Hereinafter, an embodiment of the present invention will be described with reference to the drawings.

Figure 1:
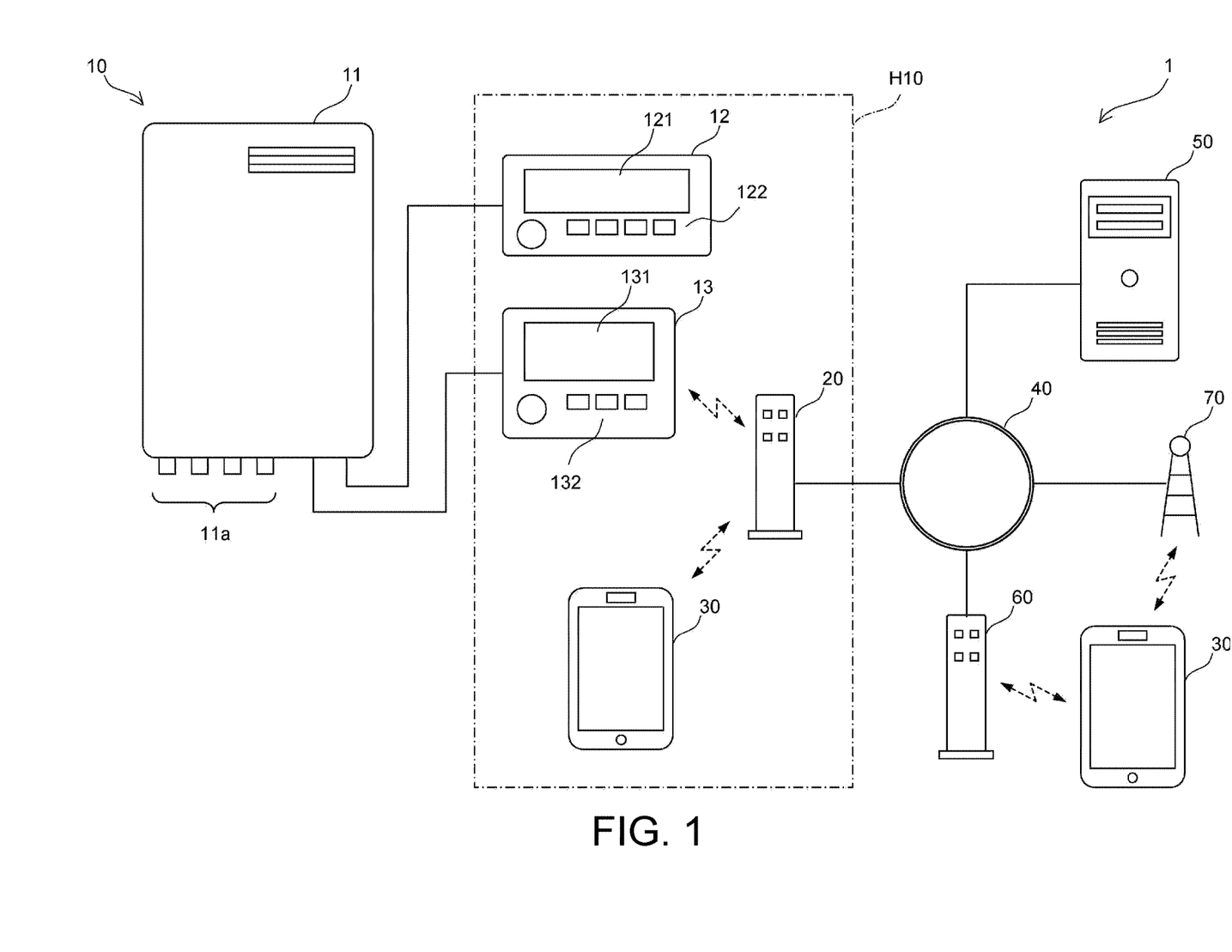
FIG. 1 is a diagram illustrating a configuration of a hot-water supply system according to an embodiment.

FIG. 1 is a diagram illustrating a configuration of a hot-water supply system 1 according to an embodiment.

As illustrated in FIG. 1, the hot-water supply system 1 includes a hot-water supply device 10, a router 20, a portable terminal device 30, an external communication network 40, and a server 50.

The hot-water supply device 10 includes a water heater 11 and remote controllers 12 and 13. The water heater 11 is a gas water heater that supplies hot water using a gas as a fuel. Hot water generated by the water heater 11 is supplied to a tap of a kitchen, a bathtub, a faucet, and the like through pipes connected to a hot-water supply port 11a. When the water heater 11 includes a floor heating function, a bathroom heating function and a heating function using a panel heater, hot water is supplied from the water heater 11 to apparatuses that realize these functions.

The remote controllers 12 and 13 are connected to the water heater 11 and used to perform various settings with respect to each function of the hot-water supply device 10. The remote controllers 12 and 13 respectively include display units 121 and 131 and input units 122 and 132. An operator can perform arbitrary settings with respect to hot water filling, hot water temperature adjustment, and the like by operating the input units 122 and 132 according to screens displayed on the display units 121 and 131. The remote controller 12 is provided in a bathroom and the remote controller 13 is provided in a kitchen or the like.

Hereinafter, the remote controller 12 provided in a bathroom is referred to as a "bathroom remote control 12" and the remote controller 13 provided in a kitchen or the like is referred to as a "kitchen remote control 13."

The router 20 is a wireless router for connecting each apparatus present in a building (here, a house H10) to the server 50 via the external communication network 40. A unique basic service set identifier (BSSID) is assigned to the router 20 as an identifier individually assigned for each router.

The kitchen remote control 13 is connected to the router 20 through wireless communication. In addition, when the portable terminal device 30 is present in the house H10, the portable terminal device 30 is connected to the router 20 through wireless communication and can communicate with the server 50. The portable terminal device 30 is a cellular phone, for example. In addition, the portable terminal device 30 may be another portable terminal device such as a portable tablet terminal. The external communication network 40 is the Internet, for example.

The server 50 for managing remote control (remote operation and remote monitoring) with respect to the hot-water supply device 10 is connected to the external communication network 40. The kitchen remote control 13 performs communication with the server 50 via the router 20 and the external communication network 40. When the portable terminal device 30 is present in the house H10, the portable terminal device 30 performs communication with the server 50 via the router 20 and the external communication network 40. In addition, when the portable terminal device 30 is present outdoors, the portable terminal device 30 is connected to the external communication network 40 via a router 60 or a base station 70 installed outside and performs communication with the server 50.

An application program of the hot-water supply system 1 is downloaded from the server 50 to the kitchen remote control 13 and the portable terminal device 30 and installed therein. This application program includes address information (IP address) for accessing the server 50. The kitchen remote control 13 and the portable terminal device 30 access the server 50 and perform communication on the basis of this address information. Address information of the kitchen remote control 13 is transmitted to the server 50 and stored therein at the time of initial setting. In addition, address information of the portable terminal device 30 is transferred from the portable terminal device 30 to the kitchen remote control 13, transmitted from the kitchen remote control 13 to the server 50, and stored therein at the time of a pairing process which will be described later.

In the present embodiment, media access control (MAC) addresses stored in a wireless communication unit 136 of the kitchen remote control 13 and a wireless communication unit 305 (refer to FIG. 2) of the portable terminal device 30, which will be described later, are used as the address information of the kitchen remote control 13 and the portable terminal device 30. Global IP addresses of the wireless communication unit 136 of the kitchen remote control 13 and the wireless communication unit 305 of the portable terminal device 30 may be used as the address information of the kitchen remote control 13 and the portable terminal device 30.

In the configuration of FIG. 1, the operator can perform remote control (remote operation and remote monitoring) with respect to the hot-water supply device 10 using the portable terminal device 30 both in the house H10 and outdoors.

That is, when the portable terminal device 30 is present in any of the house H10 and outdoors, a setting request input by the operator to the portable terminal device 30 is transmitted to the server 50 via the external communication network 40 once. Upon reception of this, the server 50 transmits the received setting request to the hot-water supply device 10 associated in advance with the portable terminal device 30 that has received the setting request. Accordingly, the setting request is transmitted to the kitchen remote control 13 of the corresponding hot-water supply device 10 via the external communication network 40 and the router 20. In this manner, settings of details requested by the operator are applied to the hot-water supply device 10 through a remote operation.

In addition, state information of the hot-water supply device 10 is transmitted from the kitchen remote control 13 to the server 50 via the router 20 at any time at predetermined intervals. The server 50 manages the received state information for each hot-water supply device 10. An access request input by the operator to the portable terminal device 30 is transmitted to the server 50 via the external communication network 40 once. Upon reception of this, the server 50 transmits state information of a hot-water supply device 10 designated by the access request among hot-water supply devices 10 associated in advance with the portable terminal device 30 that has received the access request to the portable terminal device 30. Accordingly, a state of the hot-water supply device 10 is output through the portable terminal device 30. In this manner, the operator can check the state of the hot-water supply device 10 both indoors and outdoors.

Figure 2:
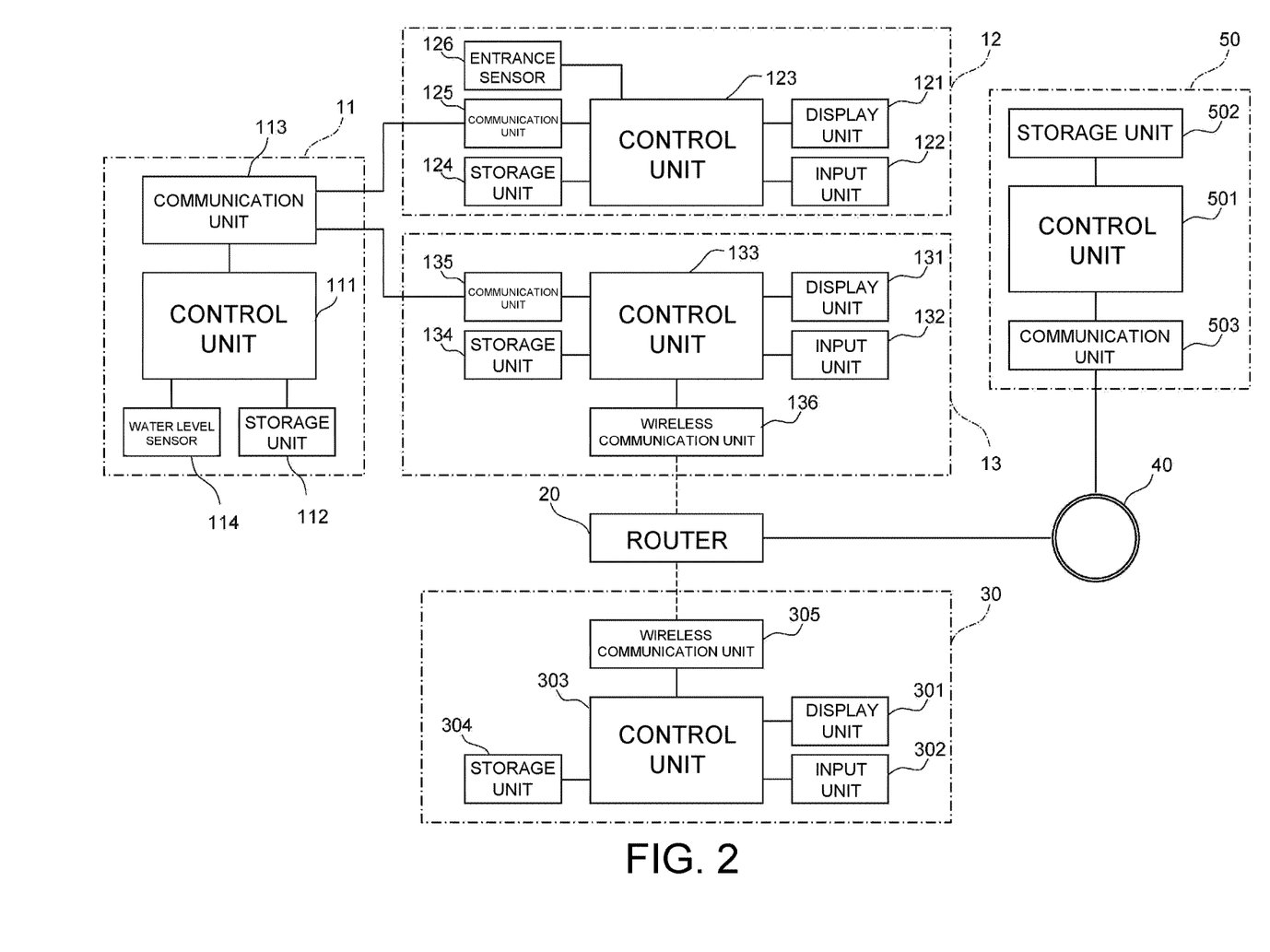
FIG. 2 is a diagram illustrating a circuit block of each apparatus constituting the hot-water supply system according to the embodiment.

FIG. 2 is a diagram illustrating a circuit block of each apparatus constituting the hot-water supply system 1.

The water heater 11 includes a control unit 111, a storage unit 112, a communication unit 113, and a water level sensor 114. The control unit 111 includes a central processing unit (CPU) and performs control of each part in the water heater 11 according to a program stored in the storage unit 112. The storage unit 112 includes a memory and stores a predetermined control program. The communication unit 113 performs communication with the bathroom remote control 12 and the kitchen remote control 13 according to control of the control unit 111.

The water level sensor 114 detects a water level of a bathtub to which the hot-water supply device 10 is connected. For example, the water level sensor 114 detects a water level of the bathtub using a water pressure in a pipe connected to the bathtub. The control unit 111 detects that a person has entered the bathtub or has exited the bathtub from a change in the water level detected by the water level sensor 114.

The bathroom remote control 12 includes a control unit 123, a storage unit 124, a communication unit 125, and an entrance sensor 126 in addition to the above-described display unit 121 and input unit 122. The display unit 121 is configured as a liquid crystal panel, for example. The input unit 122 includes various operation buttons such as a temperature setting button. The display unit 121 may be a touch panel. The control unit 123 includes a CPU and performs predetermined control according to a program stored in the storage unit 124. The storage unit 124 includes a memory and stores a predetermined control program. The communication unit 125 performs communication with the water heater 11 according to control of the control unit 123. The entrance sensor 126 detects entry/exit of a person into/from a bathroom. The entrance sensor 126 is a human body sensor using infrared rays, for example. The control unit 123 detects that a person has entered the bathroom on the basis of the output of the entrance sensor 126.

The kitchen remote control 13 includes a control unit 133, a storage unit 134, and a communication unit 135 in addition to the above-described display unit 131 and input unit 132. The display unit 131 is configured as a liquid crystal panel, for example. The input unit 132 includes various operation buttons. The display unit 131 may be a touch panel. The control unit 133 includes a CPU and performs predetermined control according to a program stored in the storage unit 134. The storage unit 134 includes a memory and stores a predetermined control program. The communication unit 135 performs communication with the water heater 11 according to control of the control unit 133.

Further, the kitchen remote control 13 includes a wireless communication unit 136. Here, the wireless communication unit 136 is a wireless communication module that can perform wireless communication with the router 20. An IP address for identifying an apparatus on a local area network (LAN) set in the house H10 is assigned to the wireless communication unit 136 (wireless communication module). In addition, the wireless communication unit 136 stores the aforementioned MAC address. In addition, the kitchen remote control 13 includes a speaker for outputting sound.

The portable terminal device 30 includes a display unit 301, an input unit 302, a control unit 303, a storage unit 304, and a wireless communication unit 305. The display unit 301 is configured as a liquid crystal panel, for example. The input unit 302 includes various operation buttons and a touch panel laminated on the display unit 301.

The control unit 303 includes a CPU and performs predetermined control according to a program stored in the storage unit 304. The storage unit 304 includes a memory and stores a predetermined control program. The wireless communication unit 305 performs communication with the router 20 according to control of the control unit 303. The wireless communication unit 305 is a wireless communication module that can perform wireless communication with the router 20. An IP address is also assigned to the wireless communication unit 305. Further, the wireless communication unit 305 stores the aforementioned MAC address. In addition, the portable terminal device 30 includes a speaker for outputting sound.

The server 50 includes a control unit 501, a storage unit 502, and a communication unit 503. The control unit 501 includes a CPU and performs predetermined control according to a program stored in the storage unit 502. The storage unit 502 includes a memory and a hard disk and stores a predetermined control program and a database. The communication unit 503 performs predetermined control according to control of the control unit 501.

In the present embodiment, the portable terminal device 30 capable of performing remote control (remote operation and remote monitoring) of the hot-water supply device 10 is registered in the server 50 in association with the hot-water supply device 10 in advance. That is, the hot-water supply device 10 and the portable terminal device 30 are paired in advance and information representing the pairing is managed in the server 50.

In the present embodiment, this pairing is performed in the building in which the hot-water supply device 10 is installed. That is, if a holder of the portable terminal device 30 cannot enter the building in which the hot-water supply device 10 is installed with the portable terminal device 30 carried by the holder, the portable terminal device 30 of the holder and the hot-water supply device 10 cannot be paired in principle. Accordingly, a possibility of the portable terminal device 30 and the hot-water supply device 10 being illegally paired by an ill-intentioned third person is reduced. Therefore, a risk of inappropriately performing remote control (remote operation and remote monitoring) can be curbed.

Figure 3:
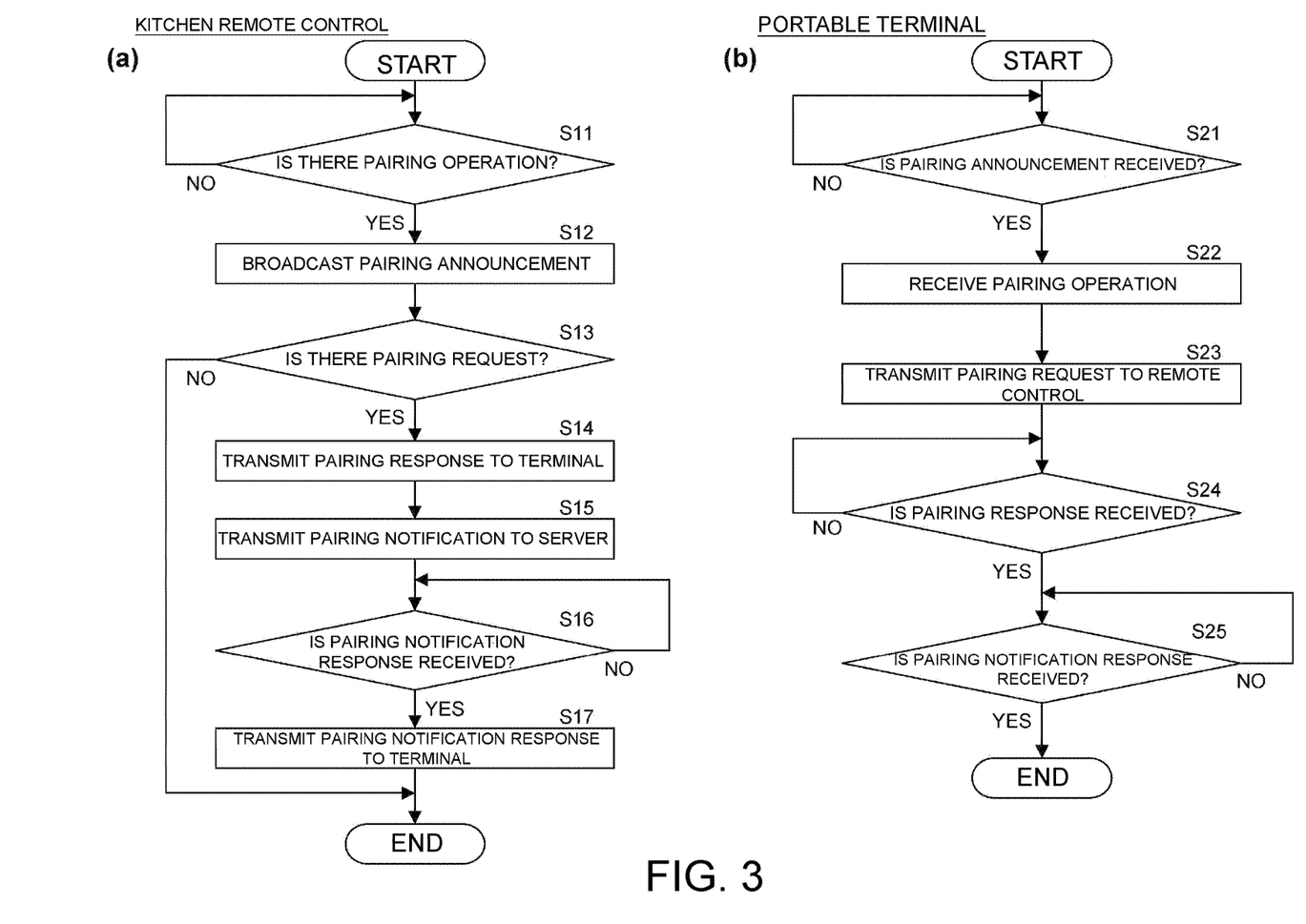

(a) and (b) of FIG. 3 are flowcharts illustrating processes in the kitchen remote control 13 and the portable terminal device 30 for pairing of the hot-water supply device 10 and the portable terminal device 30.

An operator starts an application program of the hot-water supply system installed in the portable terminal device 30 in the house H10 and sets the portable terminal device 30 in a pairing mode. Thereafter, the operator performs an operation for pairing on the input unit 132 of the kitchen remote control 13.

Referring to (a) of FIG. 3, when the pairing operation is performed on the kitchen remote control 13 (S11: YES), the control unit 133 of the kitchen remote control 13 transmits an announcement for pairing through broadcasting (S12). When the portable terminal device 30 is present in the house H10, this announcement is received by the portable terminal device 30.

Referring to (b) of FIG. 3, when the control unit 303 of the portable terminal device 30 receives the announcement (S21: YES), the control unit 303 causes the display unit 301 to display a reception screen for receiving the pairing operation (S22). The operator performs an operation for pairing on this reception screen. For example, the reception screen includes a button for acknowledging pairing. The operator acknowledges pairing by touching this button. Accordingly, the control unit 303 transmits a pairing request to the kitchen remote control 13 (S23). This pairing request includes ID information and address information (MAC address) of the portable terminal device 30. For example, a universally unique identifier (UUID) or a globally unique identifier (GUID) of the wireless communication unit 305 may be used as the ID information of the portable terminal device 30.

Referring to (a) of FIG. 3, when the control unit 133 of the kitchen remote control 13 receives the pairing request from the portable terminal device 30 within a predetermined time from transmission of the announcement (S13: YES), the control unit 133 transmits a pairing response to the portable terminal device 30 (S14) and additionally transmits a pairing notification to the server 50 via the router 20 (S15). This pairing notification includes the ID information and the address information of the portable terminal device 30 included in the pairing request and ID information of the hot-water supply device 10 (here, the kitchen remote control 13). For example, a UUID or a GUID of the wireless communication unit 136 may be used as the ID information of the kitchen remote control 13. On the other hand, when the pairing request has not been received within the predetermined time (S13: NO), the control unit 133 ends the process without transmitting the pairing notification to the server 50.

The control unit 133 of the kitchen remote control 13 waits to receive a response (pairing notification response) to the pairing notification from the server 50 after transmitting the pairing notification to the server 50 in step S15 (S16). As will be described later, when association of the hot-water supply device 10 (here, the kitchen remote control 13) with the portable terminal device 30 is performed in the server 50 on the basis of the pairing notification, the pairing notification response is transmitted from the server 50 to the control unit 133 of the kitchen remote control 13 via the router 20. In this manner, when the pairing notification response is received (S16: YES), the control unit 133 of the kitchen remote control 13 transmits the pairing notification response to the portable terminal device 30 (S17) and ends the process.

Referring to (b) of FIG. 3, the control unit 303 of the portable terminal device 30 waits to receive the pairing response from the kitchen remote control 13 after transmitting the pairing request to the kitchen remote control 13 in step S23 (S24). When the pairing response transmitted from the kitchen remote control 13 in step S14 of (a) of FIG. 3 is received (S24: YES), the control unit 303 of the portable terminal device 30 further waits to receive the paring notification response from the kitchen remote control 13 (S25). When the pairing notification response transmitted from the kitchen remote control 13 in step S17 of (a) of FIG. 3 is received (S25: YES), the control unit 303 of the portable terminal device 30 assumes that pairing is correctly registered in the server 50 and ends the process.

Figure 4:
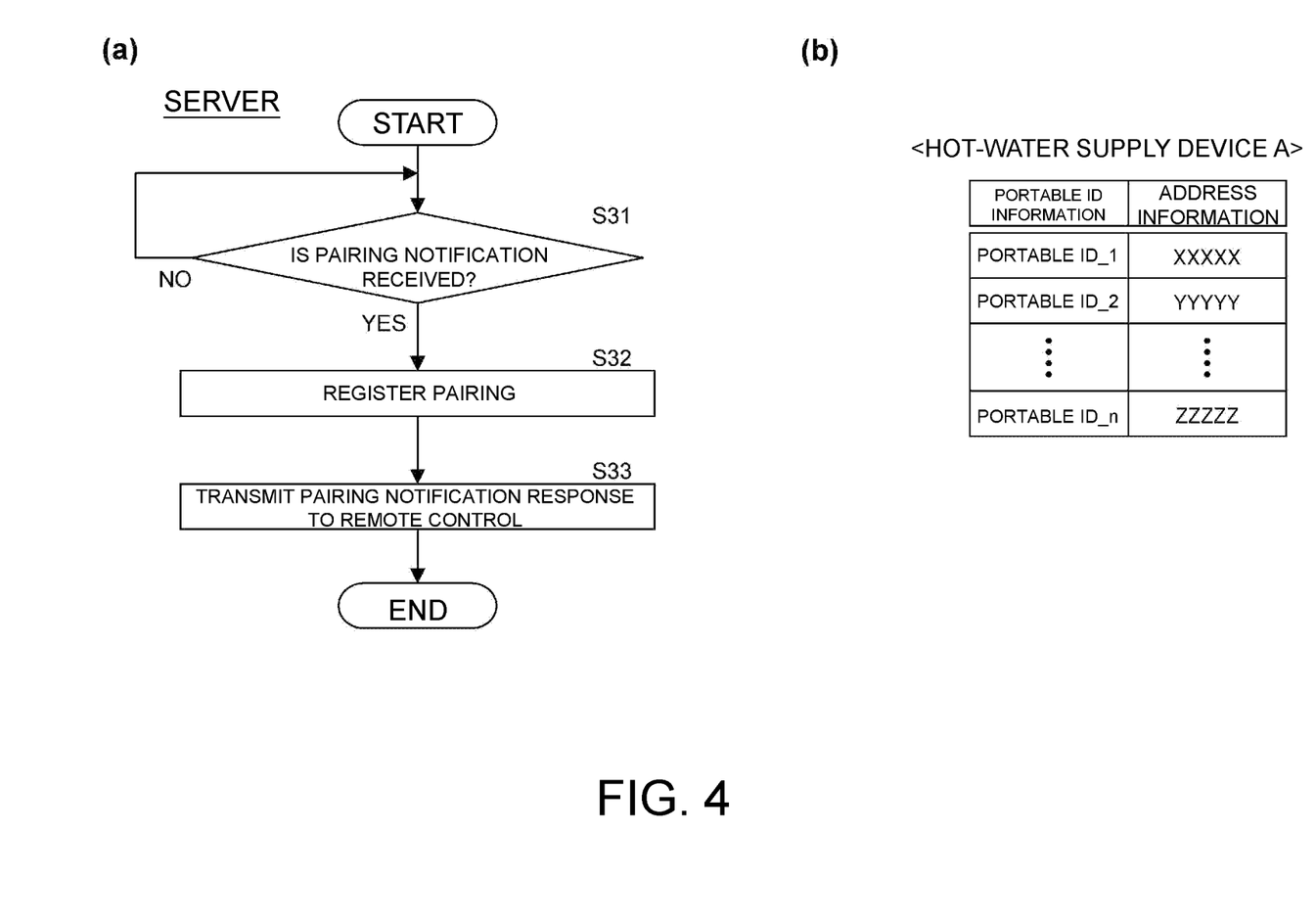

(a) of FIG. 4 is a flowchart illustrating a process in the server 50 for pairing of the hot-water supply device 10 (kitchen remote control 13) and the portable terminal device 30.

When the control unit 501 of the server 50 receives the pairing notification transmitted from the kitchen remote control 13 in step S15 of (a) of FIG. 3 (S31: YES), the control unit 501 registers pairing of the hot-water supply device 10 and the portable terminal device 30 in the database stored in the storage unit 502 on the basis of the received pairing notification (S32).

Specifically, the control unit 501 extracts the ID information and the address information of the portable terminal device 30 and the ID information of the hot-water supply device 10 (here, the kitchen remote control 13) from the received pairing notification. Then, the control unit 501 stores the extracted ID information of the hot-water supply device 10 (kitchen remote control 13) and the extracted ID information and address information of the portable terminal device 30 in the storage unit 502 in association of the ID information of the hot-water supply device 10 with the ID information and the address information of the portable terminal device 30.

(b) of FIG. 4 is a diagram illustrating a configuration of information in which the hot-water supply device 10 (here, the kitchen remote control 13) is associated with the portable terminal device 30 managed in the server 50.

As illustrated in (b) of FIG. 4, for each hot-water supply device 10, ID information of portable terminal devices 30 paired with the hot-water supply device 10 and address information of each portable terminal device 30 are managed in the server 50. Specifically, a database used for control of the hot-water supply system 1 is constructed in the storage unit 502 of the server 50 and information of (b) of FIG. 4 is managed for each hot-water supply device 10 in this database. Meanwhile, when the ID address of the portable terminal device 30 is a MAC address as described above, the address information is omitted from the configuration of (b) of FIG. 4 because the ID information is also used as the address information. In this case, the pairing notification received in step S31 does not include the address information of the portable terminal device 30.

Referring back to (a) of FIG. 4, when the control unit 501 of the server 50 performs registration of pairing in step S32, the control unit 501 transmits the pairing notification response to the kitchen remote control 13 (S33) and ends the process. The transmitted pairing notification response is received by the kitchen remote control 13 in step S16 of (a) of FIG. 3 and forwarded to the portable terminal device 30 on which the corresponding pairing has been performed in step S17.

Further, the server 50 executes a notification process of notifying another portable terminal device 30 that has already been paired that pairing has been newly performed after or in parallel to execution of the pairing process of (a) of FIG. 4.

Figure 5:
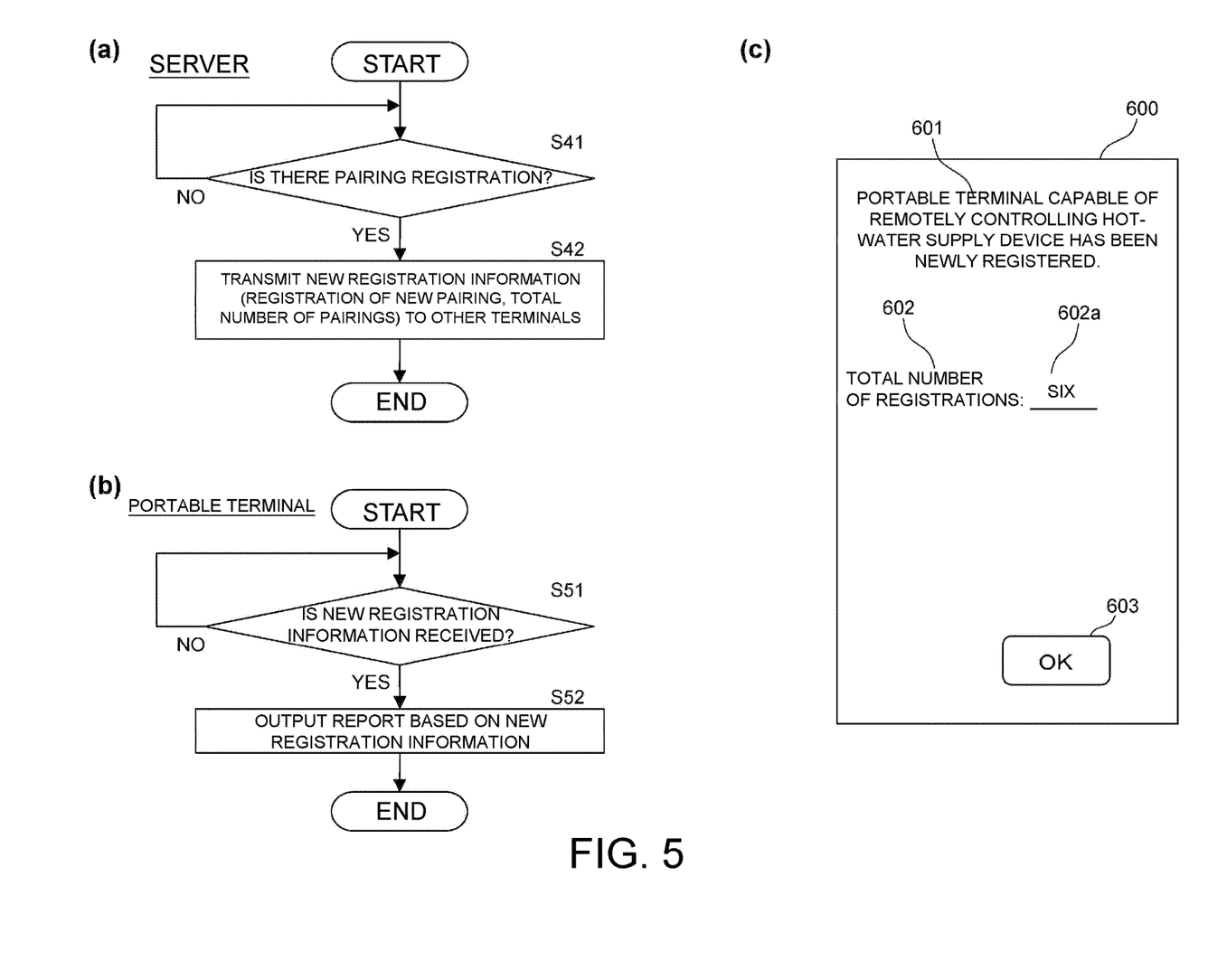

(a) of FIG. 5 is a flowchart illustrating a notification process executed in the server 50 when pairing has been newly performed.

When new pairing is registered in the database (S41: YES), the control unit 501 of the server 50 transmits information representing registration of new pairing and new registration information including a total number of portable terminal devices 30 paired with the hot-water supply device 10 (here, the kitchen remote control 13) to other portable terminal devices 30 (existing portable terminal devices 30) paired with the hot-water supply device 10 (here, the kitchen remote control 13) before the registration is performed (S42).

Here, the total number of portable terminal devices 30 included in the new registration information also includes the portable terminal devices 30 pairing-registered in step S41. In addition, other portable terminal devices 30 are identified on the basis of pairing information of the hot-water supply device 10 (here, the kitchen remote control 13) illustrated in (b) of FIG. 4.

(b) of FIG. 5 is a flowchart illustrating a report output process executed in the portable terminal device 30 according to notification through the notification process of (a) of FIG. 5.

When the control unit 303 of the portable terminal device 30 receives the new registration information from the server 50 (S51: YES), the control unit 303 performs report output based on the received new registration information (S52). Specifically, the control unit 303 causes the display unit 301 to display a report screen 600 illustrated in (c) of FIG. 5. Here, a reporting sound for informing reception of the new registration information may be simultaneously output.

As illustrated in (c) of FIG. 5, the report screen 600 includes messages 601 and 602 and an operation button 603. The message 601 is text reporting that a portable terminal device 30 capable of remotely controlling the hot-water supply device 10 has been newly registered. In addition, the message 602 is text reporting a total number of portable terminal devices 30 capable or remotely controlling the hot-water supply device 10. The total number included in the new registration information is displayed as a number of an item 602a of the message 602. Further, a total number before new registration may be included in the report screen 600. Accordingly, a user can clearly ascertain that the total number displayed in the message 602 includes the number of newly registered portable terminal devices 30.

The user touches the operation button 603 after checking the messages 601 and 602. Accordingly, the report screen 600 is closed and the report output process ends.

Effects of Embodiment

According to the present embodiment, the following effects can be obtained.

As described above with reference to FIGS. 5(a) to (c), when a portable terminal device 30 for performing remote control is newly associated with the hot-water supply device 10, other portable terminal devices 30 that have already been associated are notified of the new association. Accordingly, users of the other portable terminal devices 30 can determine whether the new association is suspicious. Therefore, it is possible to prevent the hot-water supply device 10 from being inappropriately remotely controlled by an unintended portable terminal device 30.

Here, the notification for the other portable terminal devices 30 includes information based on a total number of portable terminal devices 30 associated with the hot-water supply device 10, and the total number of portable terminal devices 30 associated with the hot-water supply device 10 is output through the other portable terminal devices 30 on the basis of this information. Accordingly, the users of the other portable terminal devices 30 can determine whether the new association is suspicious more appropriately, for example, by comparing the number of portable terminal devices 30 carried by their families which will perform remote control of the hot-water supply device 10 with the number of portable terminal devices 30 output through a report process.

Accordingly, it is possible to more securely prevent the hot-water supply device 10 from being inappropriately remotely controlled by an unintended portable terminal device 30.

In addition, in the report output process, the report screen 600 including new association of portable terminal devices 30 for performing remote control and the total number of paired portable terminal devices 30 is displayed on the display unit 301 in other portable terminal devices 30, as illustrated in (c) of FIG. 5. Accordingly, the users of the other portable terminal devices 30 can clearly ascertain that the portable terminal devices 30 for performing remote control have been newly associated. Therefore, it is possible to appropriately determine whether new association is suspicious.

Meanwhile, in the present embodiment, the notification process illustrated in (a) of FIG. 5 is executed by the control unit 501 of the server 50. In this manner, the control unit 501 of the server 50 that manages remote control executes the notification process, and thus the notification process can be performed more smoothly.

Modified Example

Although the new registration information for reporting new pairing of a portable terminal device 30 is transmitted to other portable terminal devices 30 in the above-described embodiment, the new registration information may be additionally transmitted to the portable terminal device 30 newly registered this time.

Figure 6:
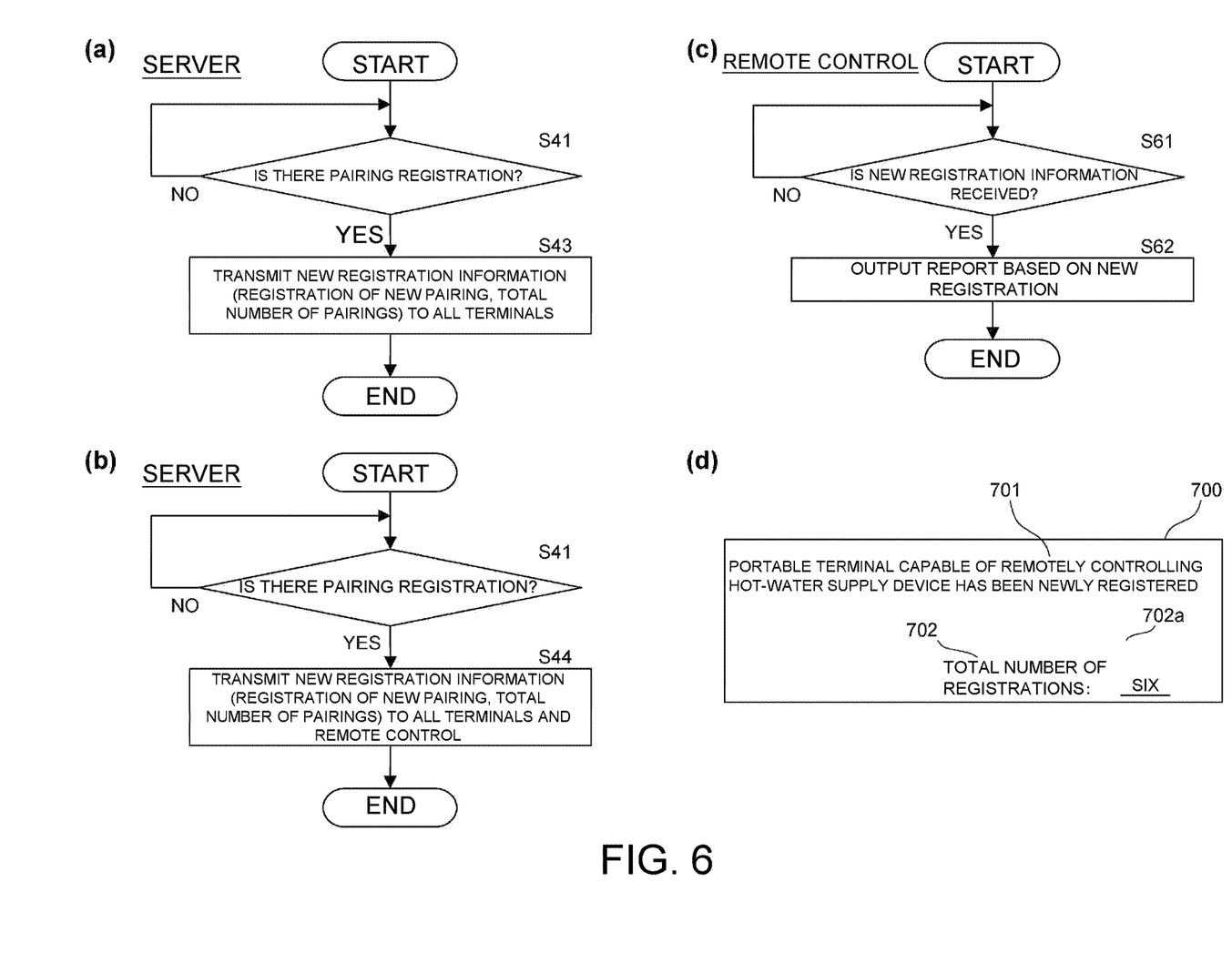

In this case, the flowchart of (a) of FIG. 5 is changed as illustrated in (a) of FIG. 6. Here, step S42 of (a) of FIG. 5 is changed to step S43. In step S43, the new registration information is transmitted to the portable terminal device 30 newly registered this time in addition to the existing portable terminal devices 30 (other portable terminal devices 30). The portable terminal device 30 newly registered this time executes the same report output process as illustrated in (b) of FIG. 5. Accordingly, the report screen 600 of (c) of FIG. 5 is also displayed on the newly registered portable terminal device 30.

When the report screen 600 including the number of portable terminal devices 30 associated with the hot-water supply device 10 is also displayed on the newly associated portable terminal device 30 in this manner, a user of the newly associated portable terminal device 30 can check whether past association with the hot-water supply device 10 remains through the number that is notified of when the user initially performs association of the portable terminal device 30 with the hot-water supply device 10, for example, at the time of moving or the like. That is, the user can determine that past association with the hot-water supply device 10 remains when a number equal to or greater than 2 is displayed as a total number of associated portable terminal devices 30 even though the user initially has performed association. Accordingly, it is possible to prevent a possibility that the hot-water supply device 10 is undesirably remotely controlled by an inappropriate portable terminal device 30 associated in the past.

Meanwhile, the new registration information may be additionally transmitted to the hot-water supply device 10 (here, the kitchen remote control 13) and the report output process may be performed.

In this case, the flowchart of (a) of FIG. 5 is changed as illustrated in (b) of FIG. 6. Here, step S42 of (a) of FIG. 5 is changed to step S44. In step S44, the new registration information is also transmitted to the hot-water supply device 10 (here, the kitchen remote control 13) in addition to the existing portable terminal devices 30 (other portable terminal devices 30) and the portable terminal device 30 newly registered this time. In this case, the hot-water supply device 10 (here, the kitchen remote control 13) executes a process of (c) of FIG. 6.

That is, when the control unit 133 of the kitchen remote control 13 receives the new registration information from the server 50 (S61: YES), the control unit 133 performs report output based on the received new registration information (S62). Specifically, the control unit 133 causes the display unit 131 to display a report screen 700 illustrated in (d) of FIG. 6. Here, a reporting sound for informing reception of the new registration information may be simultaneously output from the kitchen remote control 13.

As illustrated in (d) of FIG. 6, the report screen 700 includes a message 701 for reporting that a portable terminal device 30 capable of remotely controlling the hot-water supply device 10 has been newly registered and a message 702 for reporting a total number of portable terminal devices 30 capable of remotely controlling the hot-water supply device 10. A total number included in the new registration information is displayed as a number of an item 702a of the message 702.

In this modified example, the owner of the building in which the hot-water supply device 10 is installed, and the like can also ascertain new association of the portable terminal device 30 with the hot-water supply device 10 and the total number of associated portable terminal devices 30 through the report screen 700 in addition to the user of the newly registered portable terminal device 30. Accordingly, a situation in which it is determined whether the new association is suspicious can be extended and, as a result, it is possible to more securely prevent the hot-water supply device 10 from being inappropriately remotely controlled by an unintended portable terminal device 30.

Meanwhile, when the new registration information is transmitted to the hot-water supply device 10 (here, the kitchen remote control 13), the new registration information need not necessarily be transmitted to the newly registered portable terminal device 30. In this case, the user of the newly registered portable terminal device 30 can check whether the situation of association of the portable terminal device 30 corresponding to the hot-water supply device 10 is appropriate through the report screen 700 displayed on the kitchen remote control 13 instead of his/her portable terminal device 30. For example, the user of the newly registered portable terminal device 30 can check whether past association with the hot-water supply device 10 remains when the user has newly performed association at the time of moving by referring to the report screen 700 displayed on the kitchen remote control 13.

Other Modified Examples

Although the wireless communication unit 136 is provided in the kitchen remote control 13 constituting the hot-water supply device 10 in the above-described embodiment and modified example, the wireless communication unit may be provided in the water heater 11 and the water heater 11 may be connected to the router 20. In this case, control by the kitchen remote control 13 in the above-described embodiment and modified example is performed by the control unit 111 of the water heater 11. Alternatively, a controller including the wireless communication unit other than the water heater 11, the bathroom remote control 12, and the kitchen remote control 13 may be disposed in the hot-water supply device 10 and connected to the router 20. In this case, control by the kitchen remote control 13 in the above-described embodiment and modified example is performed by a control unit of the controller.

Meanwhile, notification control illustrated in (a) of FIG. 5 may be performed by another control device connected to the external communication network 40. In this case, the other control device stores the database illustrated in (b) of FIG. 4, and when a notification indicating that a portable terminal device 30 has been newly associated with a predetermined hot-water supply device 10 is received from the server 50, for example, transmits the same new registration information as the above to other portable terminal devices 30 that have already been associated with the hot-water supply device 10. Control of the portable terminal device 30 when this new registration information has been received is executed in the same manner as in the above-described embodiment. In addition, the other control device may also transmit the new registration information to the newly registered portable terminal device 30 and the kitchen remote control 13 in addition to the other portable terminal devices 30.

In addition, notification control illustrated in (a) of FIG. 5 may be performed by the kitchen remote control 13. In this case, the kitchen remote control 13 stores information on portable terminal devices 30 associated with the hot-water supply device 10 thereof, that is, information having the same configuration as (b) of FIG. 4, in the storage unit 134. In addition, the control unit 133 of the kitchen remote control 13 transmits the same new registration information as the above to other portable terminal devices 30 that have already been associated with the hot-water supply device 10 thereof when the pairing notification response is received from the server 50 in step S16 of (a) of FIG. 3. Control of the portable terminal devices 30 when this new registration information is received is performed in the same manner as in the above-described embodiment. Further, the other control device may also transmit the new registration information to the newly registered portable terminal device 30 and the kitchen remote control 13 in addition to other portable terminal devices 30. The other control device connected to the router 20 may perform notification control illustrated in (a) of FIG. 5.

In addition, output of report of new association of a portable terminal device 30 with the hot-water supply device 10 need not necessarily be performed through a screen and may be performed through other reporting method such as sound and the like. Further, the configurations of the report screens 600 and 700 need not necessarily be limited to the configurations illustrated in (a) of FIG. 5 and (d) of FIG. 6 and may be appropriately modified. The pairing sequence is not limited to that illustrated in the above-described embodiment and may be appropriately modified. For example, restriction on pairing performed in the building in which the hot-water supply device 10 is installed may be eliminated.

Meanwhile, terminal devices that remotely operate the hot-water supply device 10 may include stationary terminal devices that do not have portability and are installed in predetermined places.

In addition, the embodiment of the present invention can be appropriately modified in various manners within the scope of the claims.

What is claimed is:

1. A hot-water supply system for remotely controlling a hot-water supply device connectable to an external communication network using a portable terminal device via a server, comprising: a processor which is configured to perform a notification process for notifying at least other portable terminal devices that have already been associated that the portable terminal device for performing remote control has been newly associated with the hot-water supply device,
   wherein the processor is further configured to notify the other portable terminal devices of information including a number of the portable terminal devices associated with the hot-water supply device in the notification process,
   wherein the processor is further configured to perform the notification to the newly associated portable terminal device in addition to the other portable terminal devices in the notification process.

2. The hot-water supply system according to claim 1, wherein the processor is a processor of the server.

3. A non-transitory computer readable recording medium storing a program causing a computer of a portable terminal device to execute, when a notification according to the notification process according to claim 1 is received from the processor, a function of performing report output based on the notification.

4. The non-transitory computer readable recording medium according to claim 3, wherein the function of performing report output comprises a function of causing a display unit to display new association of the portable terminal device for performing the remote control.

5. A non-transitory computer readable recording medium storing a program causing a computer of a portable terminal device to execute, when a notification according to the notification process according to claim 1 is received from the processor, at least a function of performing report output of the number.

6. The non-transitory computer readable recording medium according to claim 5, wherein the function of performing report output comprises a function of causing a display unit to display the number.

* * * * *